United States Patent
Kangas et al.

(10) Patent No.: US 8,453,921 B2
(45) Date of Patent: Jun. 4, 2013

(54) DATA TRANSFERS WITH BAR CODES

(75) Inventors: Paul D. Kangas, Raleigh, NC (US);
Regina D. Kangas, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 12/511,689

(22) Filed: Jul. 29, 2009

(65) Prior Publication Data
US 2011/0024490 A1 Feb. 3, 2011

(51) Int. Cl.
*G06F 17/00* (2006.01)

(52) U.S. Cl.
USPC ...... 235/375; 235/380; 235/462.01; 235/487; 235/494

(58) Field of Classification Search
USPC .................. 235/375, 380, 462.01, 487, 494
See application file for complete search history.

(56) References Cited

U.S. PATENT DOCUMENTS

| | | | |
|---|---|---|---|
| 5,939,699 A | 8/1999 | Perttunen et al. | |
| 6,764,011 B2 * | 7/2004 | Entani | 235/462.25 |
| 7,398,929 B2 | 7/2008 | Longacre, Jr. et al. | |
| 2003/0230630 A1 | 12/2003 | Whipple et al. | |
| 2004/0020988 A1 * | 2/2004 | Omori | 235/462.01 |
| 2004/0026511 A1 | 2/2004 | Cheung et al. | |
| 2004/0046025 A1 | 3/2004 | Lebaschi et al. | |
| 2004/0118923 A1 | 6/2004 | Creamer et al. | |
| 2005/0039092 A1 * | 2/2005 | Soule et al. | 714/724 |
| 2005/0082370 A1 | 4/2005 | Frantz et al. | |
| 2006/0015825 A1 | 1/2006 | Mizuno et al. | |

FOREIGN PATENT DOCUMENTS

GB 2420894 A 6/2006

* cited by examiner

*Primary Examiner* — Allyson Trail
(74) *Attorney, Agent, or Firm* — Edward J. Lenart; Thomas E. Tyson; Biggers & Ohanian, LLP

(57) ABSTRACT

Data transfer with of bar codes including presenting a plurality of bar codes making up the data transfer, displaying a unique sequence identification for each bar code and the total number of bar codes making up the data transfer; reading a plurality of bar codes; reading, for each bar code read, the unique sequence identification of the bar code and the total number of bar codes making up the data transfer; determining, in dependence upon the number of bar codes read and the total number of bar codes making up the data transfer whether all of the bar codes making up the data transfer have been read; and providing to a user a positive notification if all of the bar codes have been read; or providing to the user a negative notification if all of the bar codes making up the data transfer have not been read.

12 Claims, 5 Drawing Sheets

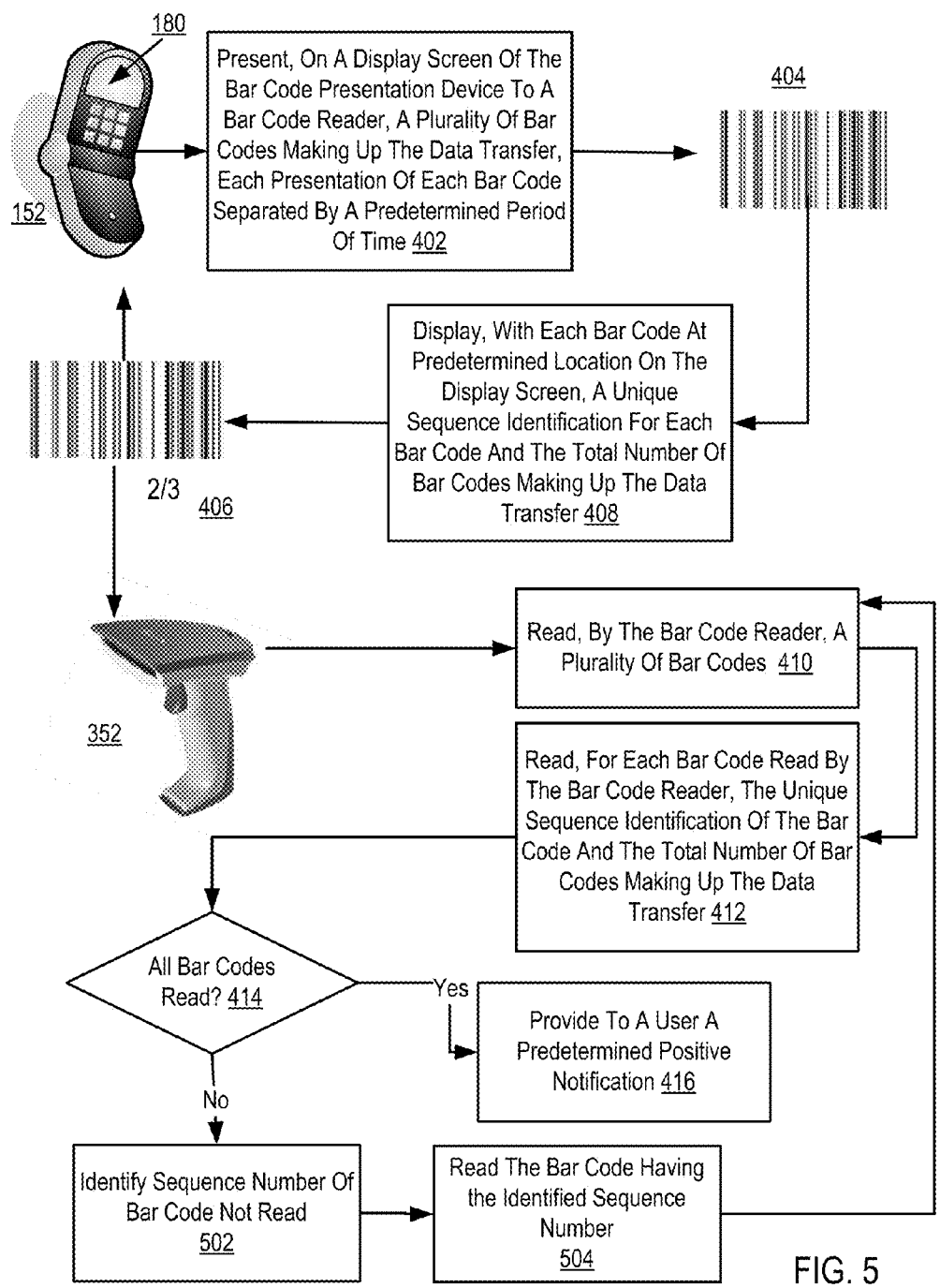

DATA TRANSFERS WITH BAR CODES

BACKGROUND OF THE INVENTION

1. Field of the Invention

The field of the invention is data processing, or, more specifically, methods, apparatus, and products for data transfers with bar codes.

2. Description of Related Art

Modern bar code scanners are capable of reading bar codes from displays on devices such as mobile phones, personal digital assistants, smart phones, computers, and other devices. E-coupons, for example, may be implemented with at single bar code and transmitted from a mobile phone to a bar code scanner. However, a static bar code provides a limited amount of data to be transferred and often the user interaction required to ensure that the bar code is accurately read can be cumbersome.

SUMMARY OF THE INVENTION

Methods, systems, apparatuses, and computer program products for data transfer with a plurality of bar codes are provided. Embodiments include presenting, on a display screen of a bar code presentation device to a bar code reader, a plurality of bar codes making up the data transfer, each presentation of each bar code separated by a predetermined period of time; displaying, with each bar code at predetermined location on the display screen, a unique sequence identification for each bar code and the total number of bar codes making up the data transfer; reading, by the bar code reader, a plurality of bar codes; reading, for each bar code read by the bar code reader, the unique sequence identification of the bar code and the total number of bar codes making up the data transfer; determining, by the bar code reader in dependence upon the number of bar codes read and the total number of bar codes making up the data transfer whether all of the bar codes making up the data transfer have been read; and providing to a user a predetermined positive notification if all of the bar codes making up the data transfer have been read; or providing to the user a predetermined negative notification if all of the bar codes making up the data transfer have not been read; or identifying, by the bar code reader if all of the bar codes making up the data transfer have not been read, the sequence number of a bar code not read and reading, by the bar code reader from the bar code presentation device, the bar code having the identified sequence number.

The foregoing and other objects, features and advantages of the invention will be apparent from the following more particular descriptions of example embodiments of the invention as illustrated in the accompanying drawings wherein like reference numbers generally represent like parts of example embodiments of the invention.

BRIEF DESCRIPTION OF THE DRAWINGS

FIG. 5 sets forth a flow chart illustrating another example method of data transfer with a plurality of bar codes according to the present invention.

DETAILED DESCRIPTION OF EXAMPLE EMBODIMENTS

Figure 1:
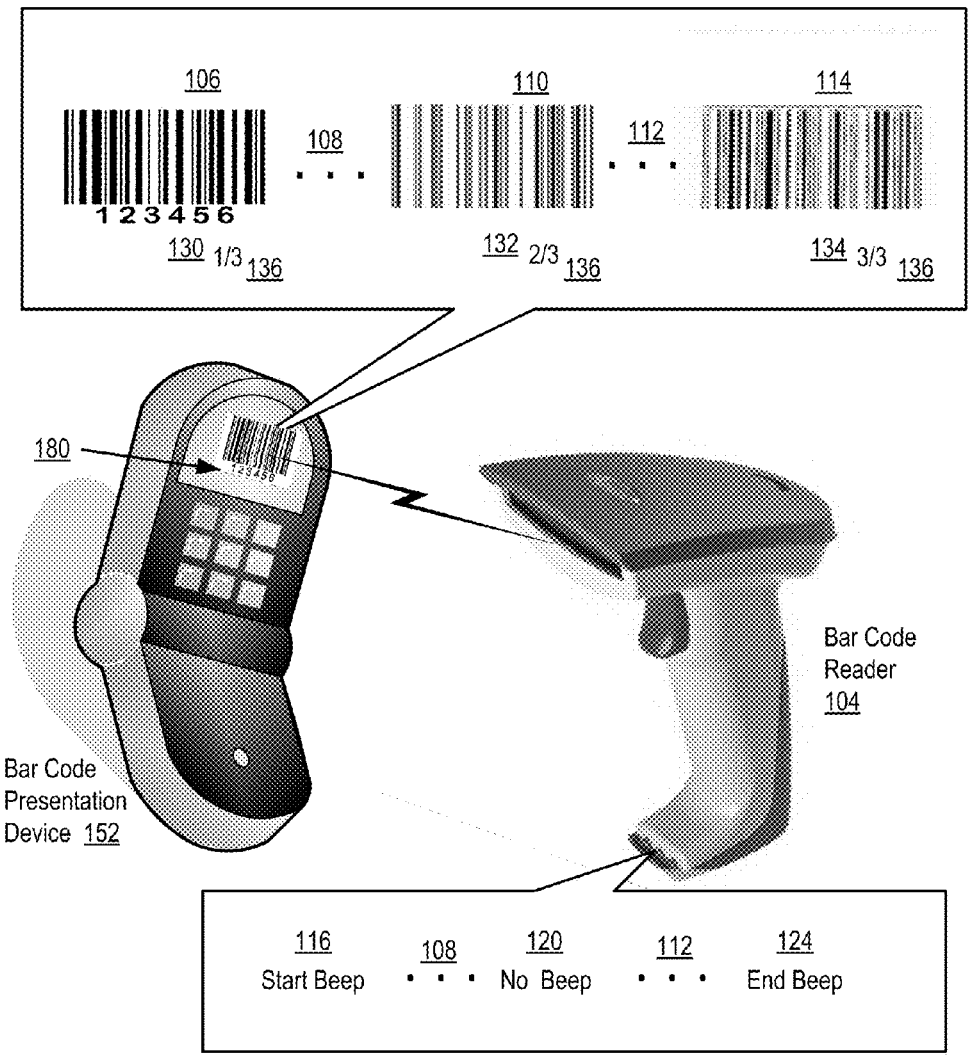
FIG. 1 sets forth a diagram of a system for data transfer with a plurality of bar codes.

Example methods, systems, apparatus, and computer program products for data transfer with a plurality of bar codes in accordance with the present invention are described with reference to the accompanying drawings, beginning with FIG. 1. FIG. 1 sets forth a diagram of a system for data transfer with a plurality of bar codes. A bar code is an optical machine-readable representation of data. One dimensional bar codes represent data using the widths and spacing of parallel lines. Two dimensional bar codes represent data using patterns of squares, dots, hexagons and other geometric patterns. Although two dimensional bar codes use symbols other than bars, they are referred to as bar codes in this specification as well.

Almost any data can be represented as one or more bar codes. An image, a document, a number, a song, or other data, for example, may be represented as one or more bar codes. Such bar codes may then be used to transfer the data from a bar code presentation device to a bar code reader which may in turn concatenate those bar codes, represent the information of the bar code as digital text string and used to recreate the original data in its native form.

The system of FIG. 1 includes a bar code presentation device (152) and a bar code reader (104). In the example of FIG. 1 the bar code presentation device (152) is implemented as a mobile phone. This is for explanation and not for limitation. In fact, personal digital assistants, computers, dedicated presentation devices, media players, computers, and many other devices may usefully serve as a bar code presentation device to carry out data transfer in accordance with the present invention.

In the example of FIG. 1, the bar code reader (104) is implemented as a handheld dedicated bar code reader. This is for explanation and not for limitation. In fact, mobile phones, smart phones, personal digital assistants, computers, media players, and many other devices may usefully serve as a bar code reader to carry out data transfer in accordance with the present invention.

In the system of FIG. 1 the bar code presentation device (152) presents on its display screen (180) to a bar code reader (352), a plurality of bar codes (106, 110, and 114) making up the data transfer. In the example of FIG. 1, each presentation of each bar code is separated by a predetermined period of time. That is, the presentation of bar code (106) is separated for a predetermined period of in time (108) from the presentation of bar code (110). Similarly, the presentation of bar code (110) is separated for a predetermined period of in time (110) from the presentation of bar code (114). The example, of FIG. 1 includes only three bar codes making up the data transfer. This is for ease of explanation and not for limitation. In fact, data transfers according to the present invention may usefully employ as many bar codes as needed to transfer the data desired.

In the system of FIG. 1, the bar code presentation device (152) displays, with each bar code (106, 110, and 114) at a predetermined location on the display screen (180), a unique sequence identification (130, 132, and 134) for each bar code (106, 110, and 114) and the total number of bar codes (136)

making up the data transfer. A unique sequence number indicates the order in which each bar code is to be presented relative to the bar code presented before and after. The bar codes may be presented beginning with any sequence number and cycled until either all the bar codes are read, a user stops the presentation of the bar codes, complete cycle of the bar codes is presented, or in other ways as will occur to those of skill in the art.

In the example of FIG. 1, the unique sequence identifications for each bar code and the total number of bar codes making up the data transfer are represented as alphanumeric characters separated by a slash. The unique sequence identifications (130, 132, and 134) include '1', '2', and '3' respectively and the total number of bar codes (136) is '3'. The sequence identification allows the bar code presentation device to begin at any of the bar codes making up the data transfer and cycle through all the bar codes until the reaching the same sequence number of the first bar code presented.

In the system of FIG. 1, the bar code reader (352) reads a plurality of bar codes (404). In the example of FIG. 1, upon reading the first bar code (106), the bar code reader (104) provides an audio notification that the first bar code (106) of the data transfer was successfully read. In the example, of FIG. 1, the audio notification is a unique start beep (116) from the bar code reader notifying a user that the first bar code (106) was successfully read. The bar code reader (104) of FIG. 1 also reads, for each bar code read, the unique sequence identification (130, 132, and 134) of the bar code and the total number of bar codes (136) making up the data transfer.

In the system of FIG. 1, the bar code reader determines, in dependence upon the number of bar codes read and the total number of bar codes making up the data transfer whether all of the bar codes making up the data transfer have been read. To determine whether all of the bar codes making up the data transfer have been read the bar code reader (104) maintains a count of all the bar codes read from the sequence number of the first bar code until that sequence number is again presented to the bar code reader. If the count of all the bar codes read is the same as the total number of bar codes (136) making up the data transfer, then the bar code reader has successfully read all the bar codes making up the data transfer. The bar code reader of FIG. 1 then provides to a user a predetermined positive notification that all bar codes making up the data transfer have been successfully read. In the example of FIG. 1 the predetermined positive notification is a unique end beep notifying the user that all the bar codes have been read. In the example of FIG. 1, there is no beep (120) in between the start beep (116) and the end beep (124).

If the bar code reader determines that the number of bar codes read is not the same as the total number of bar codes (136) making up the data transfer, then the bar code reader of FIG. 1 is capable two alternative actions. The bar code reader of FIG. 1 is first capable of providing to the user a predetermined negative notification. Such a notification may be a predetermined error beep. A user so notified may then initiate a new presentation of all the bar codes making up the data transfer and present them again with the bar code presentation device and continue until all of the bar codes have been read.

Alternatively, instead of providing to the user a predetermined negative notification if all of the bar codes making up the data transfer have not been read, the bar code reader of FIG. 1 is capable of a second action. The bar code reader identifies the sequence number of a bar code not read and reads from the bar code presentation device the bar code having the identified sequence number. The bar code reader of FIG. 1 identifies the sequence number of a bar code not read by maintaining a list of the sequence numbers of all bar codes successfully read during the presentation of the bar codes and traverses the list until a sequence number is identified as missing. The bar code reader then reads the bar code having the identified sequence number. In some such embodiments, the bar code presentation device cycles the bar codes making up the data transfer until the user stops the presentation of bar codes. During the cycling of bar codes the bar code reader may read the bar codes identified as having not been previously read.

Data transfers using bar codes in accordance with the present invention is generally implemented with a bar code presentation device, that is, with automated computing machinery. For further explanation, therefore, FIG. 2 sets forth a block diagram of automated computing machinery comprising an example bar code presentation device (152) useful in data transfers according to embodiments of the present invention. The bar code presentation device (152) of FIG. 2 includes at least one computer processor (156) or 'CPU' as well as random access memory (168) ('RAM') which is connected through a high speed memory bus (166) and bus adapter (158) to processor (156) and to other components of the bar code presentation device (152).

Stored in RAM (168) is a module of bar code creation firmware (202), a module of computer program instructions for converting data in its native form to a representation in bar codes. Such data in its native form may include images, files, documents, and so on as will occur to those of skill in the art. Also stored RAM (168) is a module of bar code presentation firmware (204), a module of computer program instructions for data transfers according to embodiments of the present invention. The bar code presentation firmware (204) includes computer program instructions for presenting, on a display screen (180) of the bar code presentation device (152) to a bar code reader, a plurality of bar codes making up the data transfer, each presentation of each bar code separated by a predetermined period of time; and displaying, with each bar code at predetermined location on the display screen, a unique sequence identification for each bar code and the total number of bar codes making up the data transfer.

Also stored in RAM (168) is an operating system (154). Operating systems useful in data transfers according to embodiments of the present invention include UNIX™, Linux™, Microsoft XP™, AIX™, IBM's i5/OS™, and others as will occur to those of skill in the art. The operating system (154), module of bar code creation firmware (202), and the module of bar code presentation firmware (204) in the example of FIG. 2 are shown in RAM (168), but many components of such software typically are stored in non-volatile memory also, such as, for example, on a disk drive (170).

Figure 2:
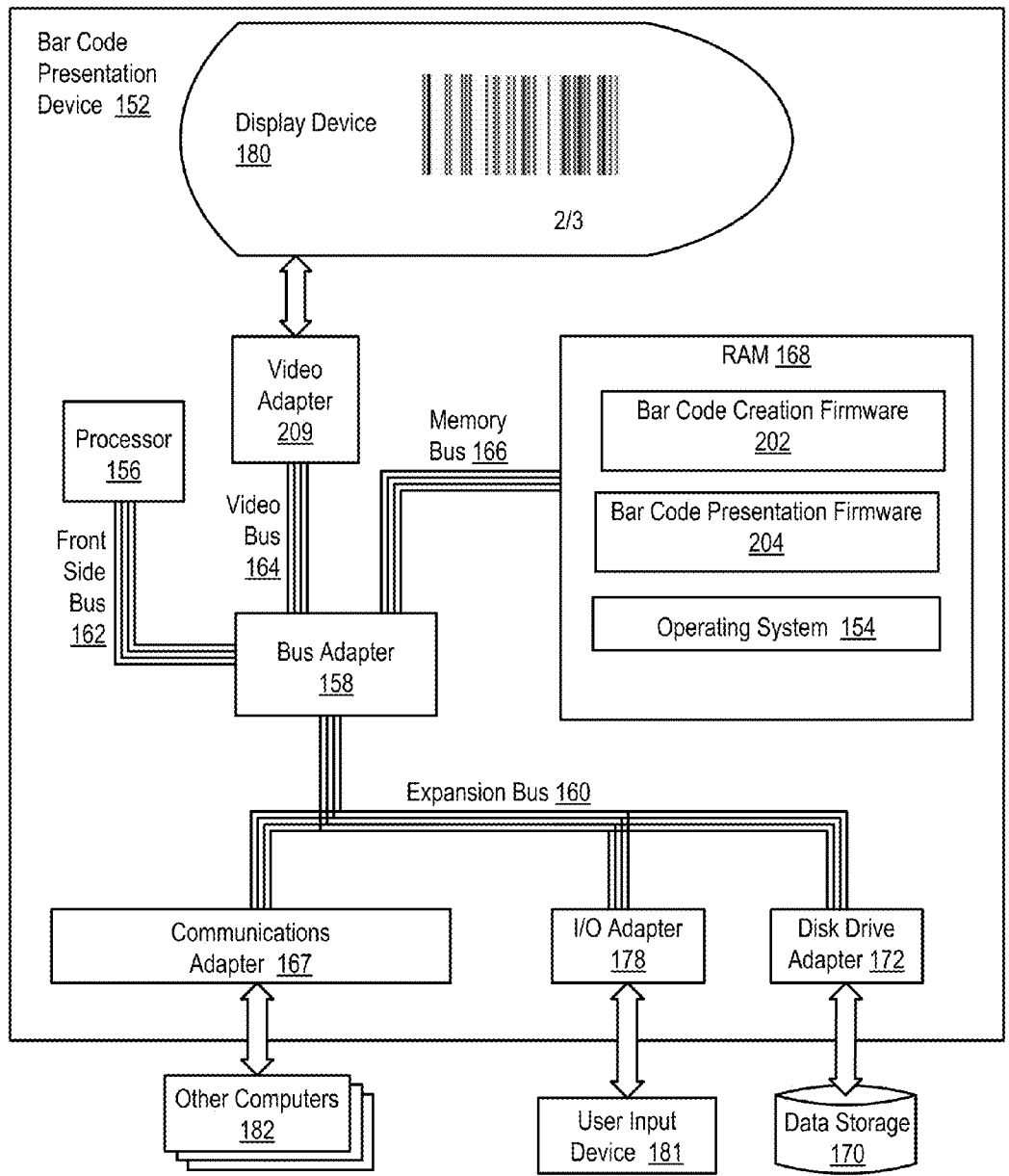
FIG. 2 sets forth a block diagram of automated computing machinery comprising an example bar code presentation device useful in data transfers according to embodiments of the present invention.

The bar code presentation device (152) of FIG. 2 includes disk drive adapter (172) coupled through expansion bus (160) and bus adapter (158) to processor (156) and other components of the bar code presentation device (152). Disk drive adapter (172) connects non-volatile data storage to the bar code presentation device (152) in the form of disk drive (170). Disk drive adapters useful in bar code presentation devices according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example bar code presentation device (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example bar code presentation device (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example bar code presentation device (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data transfers according to embodiments of the present invention include modems for wired dial-up communications, Ethernet (IEEE 802.3) adapters for wired data communications network communications, and 802.11 adapters for wireless data communications network communications.

Data transfers using bar codes in accordance with the present invention is also implemented with a bar code reader, that is, with another element of automated computing machinery. For further explanation, therefore, FIG. 3 sets forth a block diagram of automated computing machinery comprising an example bar code reader (352) useful in data transfers according to embodiments of the present invention. The bar code reader (352) of FIG. 3 also includes at least one computer processor (356) or 'CPU' as well as random access memory (368) ('RAM') which is connected through a high speed memory bus (366) and bus adapter (368) to processor (356) and to other components of the bar code reader (352).

Stored in RAM (368) is a module of bar code translation firmware (302), a module of computer program instructions for converting data in bar codes to text for conversion back to its native form. Such data in its native form may include images, files, documents and so on as will occur to those of skill in the art. Also stored RAM (368) is a module of bar code reading firmware (304), a module of computer program instructions for data transfers according to embodiments of the present invention. The bar code reading firmware (304) includes computer program instructions for reading, from a bar code presentation device, a plurality of bar codes; reading, for each bar code read, a unique sequence identification of the bar code and the total number of bar codes making up a data transfer; determining, in dependence upon the number of bar codes read and the total number of bar codes making up the data transfer whether all of the bar codes making up the data transfer have been read; and providing to a user a predetermined positive notification if all of the bar codes making up the data transfer have been read; or providing to the user a predetermined negative notification if all of the bar codes making up the data transfer have not been read or identifying, if all of the bar codes making up the data transfer have not been read, the sequence number of a bar code not read and reading, from the bar code presentation device, the bar code having the identified sequence number.

Also stored in RAM (368) is an operating system (354). Operating systems useful in data transfers according to embodiments of the present invention include UNIX™, Linux™, Microsoft XP™, AIX™, IBM's i5/OS™, and others as will occur to those of skill in the art. The operating system (354), module of bar code creation firmware (202), and the module of bar code presentation firmware (204) in the example of FIG. 3 are shown in RAM (368), but many components of such software typically are stored in non-volatile memory also, such as, for example, on a disk drive (370).

Figure 3:
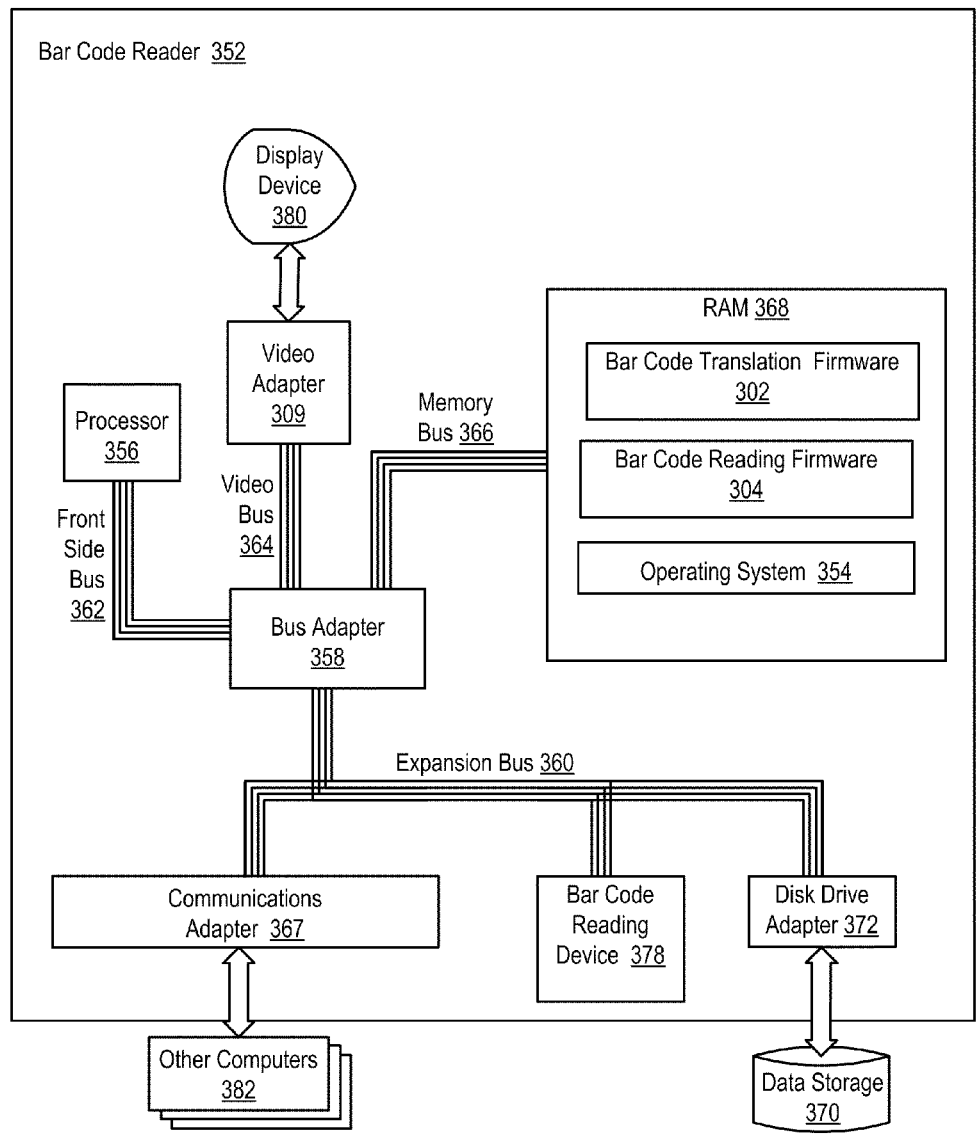
FIG. 3 sets forth a block diagram of automated computing machinery comprising an example bar code reader useful in data transfers according to embodiments of the present invention.

The bar code reader (352) of FIG. 3 includes disk drive adapter (372) coupled through expansion bus (360) and bus adapter (368) to processor (356) and other components of the bar code reader (352). Disk drive adapter (372) connects non-volatile data storage to the bar code reader (352) in the form of disk drive (370). Disk drive adapters useful in bar code readers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example bar code reader (352) of FIG. 3 includes a bar code reading device (378) a specialized input/output ('I/O') adapters for reading bar codes. The bar code reading device (378) may be a pen type bar code reading device, a laser scanner, a CCD bar code reading device, a camera based bar code reading device, or any other kind of bar code reading device that will occur to those of skill in the art. Pen type bar code reading devices for example, consist of a light source and a photodiode that are placed next to each other in the tip of a pen. To read a bar code, the tip of the pen moves across the bar code in a steady motion. The photodiode measures the intensity of the light reflected back from the light source and generates a waveform that is used to measure the widths of the bars and spaces in the bar code. Laser scanners work in a manner similar to pen type reading devices except that they use a laser beam as the light source and typically employ either a reciprocating mirror or a rotating prism to scan the laser beam back and forth across the bar code.

Charge coupled device ('CCD') bar code reading devices use an array of hundreds of tiny light sensors lined up in a row in the head of the reading device. Each sensor measures the intensity of the light immediately in front of it. Each individual light sensor in the CCD reading device is extremely small and because there are hundreds of sensors lined up in a row, a voltage pattern identical to the pattern in a bar code is generated in the reading device by sequentially measuring the voltages across each sensor in the row. The important difference between a CCD reading device and a pen or laser scanner is that the CCD reading device is measuring emitted ambient light from the bar code whereas pen or laser scanners are measuring reflected light of a specific frequency originating from the scanner itself.

Camera-based reading devices use a small video camera to capture an image of a bar code. The reading device then uses digital image processing techniques to decode the bar code. Video cameras use the same CCD technology as in a CCD bar code reading device except that instead of having a single row of sensors, a video camera has hundreds of rows of sensors arranged in a two dimensional array so that they can generate an image.

The example bar code reader (352) of FIG. 3 includes a video adapter (309), which is an example of an I/O adapter specially designed for graphic output to a display device (380) such as a display screen or computer monitor. Video adapter (309) is connected to processor (356) through a high speed video bus (364), bus adapter (368), and the front side bus (362), which is also a high speed bus.

The example bar code reader (352) of FIG. 3 includes a communications adapter (367) for data communications with other computers (382) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data transfers according to embodiments of the present invention include modems for wired dial-up communications, Ethernet (IEEE 802.3) adapters for wired data communications network communications, and 802.11 adapters for wireless data communications network communications.

Figure 4:
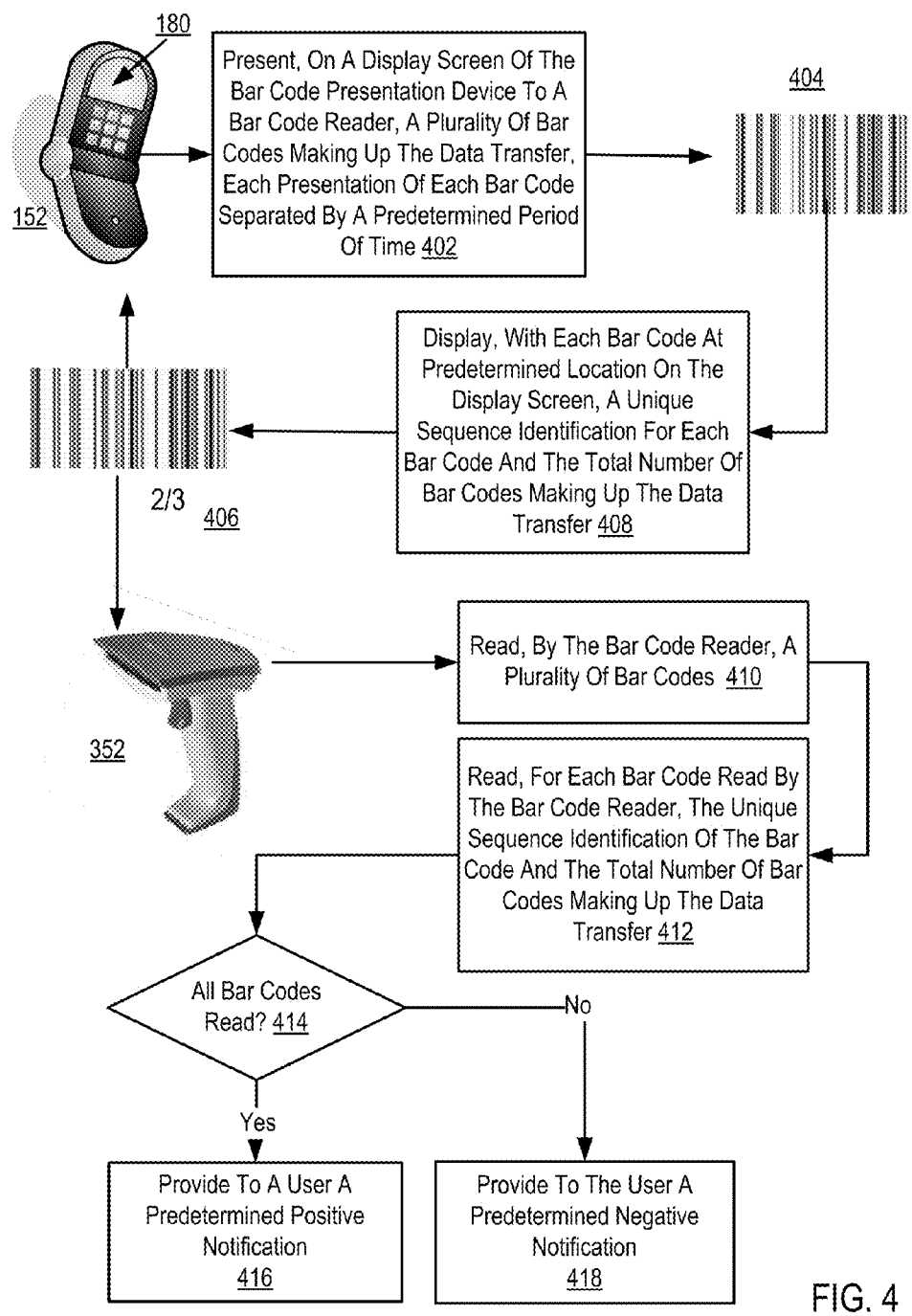
FIG. 4 sets forth a flow chart illustrating a further example method of data transfer with a plurality of bar codes according to embodiments of the present invention.

For further explanation, FIG. 4 sets forth a flow chart illustrating a further example method of data transfer with a plurality of bar codes according to embodiments of the present invention. The method of FIG. 4 is carried out with a bar code presentation device (152) and a bar code reader (352). The method of FIG. 4 includes presenting (402), on a display screen (180) of the bar code presentation device (152) to a bar code reader (352), a plurality of bar codes (404) making up the data transfer, each presentation of each bar code separated by a predetermined period of time. Presenting (402), on a display screen (180) of the bar code presentation device (152) to a bar code reader (352) may be carried out by animating in time the bar codes. That is, presenting a bar code, waiting a predetermined period of time, and presenting the next bar code. In some embodiments, in between the presentation of bar codes a bar code presentation device may display a blank screen or some predetermined symbol notifying the bar code reader that a bar code is not being presented at that moment.

The method of FIG. 4 includes displaying (406), with each bar code (404) at predetermined location on the display screen (180), a unique sequence identification (406) for each bar code and the total number of bar codes making up the data transfer (406). The unique sequence identification may include a unique dot pattern. Such a dot pattern may usefully convey both the sequence identification and the total number of bar codes presented. Alternatively, a unique sequence identification may include alphanumeric characters, another a bar code, or any other representation of a unique sequence number and total number of bar codes that will occur to those of skill in the art. Typically, the encoding of the sequence identification is designed to be quickly scanned and decoded relative to the main bar code for increased efficiency.

The method of FIG. 4 includes reading (410), by the bar code reader (352), a plurality of bar codes (404) and reading (412), for each bar code read by the bar code reader, the unique sequence identification (406) of the bar code and the total number of bar codes making up the data transfer (406). Reading (410) a plurality of bar codes (404) and reading (412) the unique sequence identification (406) of the bar code and the total number of bar codes making up the data transfer (406) may include providing to the user a indication that the first bar code has been read, and that no error in reading a bar code has yet to occur. Such indications may include unique audio indications such as a start beep, a sound indicating that the bar code reader is reading bar codes, or other earcons as will occur to those of skill in the art. Alternatively, such an indication may be a visual indication such as with LEDs, icons on a display, and so on as will occur to those of skill in the art.

The method of FIG. 4 includes determining (414), by the bar code reader (352) in dependence upon the number of bar codes read and the total number of bar codes making up the data transfer whether all of the bar codes making up the data transfer have been read. Determining (414), by the bar code reader (352) whether all of the bar codes making up the data transfer have been read may be carried out by maintaining a count of all the bar codes read from any sequence number until that sequence number is again displayed to the bar code reader and comparing the count of all the bar codes read with the total number of bar codes making up the data transfer. If the count of the bar codes read is the same as the total number of bar codes making up the data transfer then all of the bar codes making up the data transfer have been read. If the count of the bar codes read is not the same as the total number of bar codes making up the data transfer then all of the bar codes making up the data transfer have not been read.

The method of FIG. 4 includes providing (416) to a user a predetermined positive notification if all of the bar codes making up the data transfer have been read or providing (418) to the user a predetermined negative notification if all of the bar codes making up the data transfer have not been read. The positive notification and the negative notification may include predetermined audio indications such as unique beeps indicating to a user that all the bar codes were successfully read or error beeps indicating to a user that an error occurred, or any other audio indication that will occur to those of skill in the art. Alternatively, the positive notification and the negative notification may include predetermined visual indications such as LEDs of specific colors, icons on a display or any other visual indication that will occur to those of skill in the art.

Having successfully read all the bar codes making up the data transfer, the bar codes may be concatenated and translated into text for transmission to another computer or to be converted to a representation of data in another format.

In some alternative embodiments, the bar code presentation device may cycle through all the bar codes until a user is notified that they are accurately read. For further explanation, therefore, FIG. 5 sets forth a flow chart illustrating another example method of data transfer with a plurality of bar codes according to the present invention. The method of FIG. 5 is similar to the method of FIG. 4 in that the method of FIG. 5 includes presenting (402), on a display screen of the bar code presentation device to a bar code reader, a plurality of bar codes making up the data transfer, each presentation of each bar code separated by a predetermined period of time; displaying (408), with each bar code at predetermined location on the display screen, a unique sequence identification for each bar code and the total number of bar codes making up the data transfer; reading (410), by the bar code reader, a plurality of bar codes; reading (412), for each bar code read by the bar code reader, the unique sequence identification of the bar code and the total number of bar codes making up the data transfer; determining (414), by the bar code reader in dependence upon the number of bar codes read and the total number of bar codes making up the data transfer whether all of the bar codes making up the data transfer have been read; and providing (418) to a user a predetermined positive notification if all of the bar codes making up the data transfer have been read.

The method of FIG. 5 differs from the method of FIG. 4 in that instead of providing to the user a predetermined negative notification if all of the bar codes making up the data transfer have not been read, the method of FIG. 5 includes identifying (502), by the bar code reader (352) if all of the bar codes making up the data transfer have not been read, the sequence number of a bar code not read; and reading (352), by the bar code reader from the bar code presentation device, the bar code having the identified sequence number. Identifying (502) the sequence number of a bar code not read may be carried out by maintaining a list of the sequence numbers of all bar codes successfully read from the presentation of a sequence number until that sequence number is again presented and traversing the list until a sequence number is identified as missing. Reading (352), by the bar code reader from the bar code presentation device, the bar code having the identified sequence number may be carried out by continuing to read bar codes from a bar code presentation device cycling the bar codes making up the data transfer and reading the bar code having the identified sequence number upon presentation by the bar code presentation device. The method of FIG. 5 allows a user to simply wait until all of the bar codes making up the data transfer have been successfully read without requiring any additional user intervention.

Example embodiments of the present invention are described largely in the context of a fully functional computer system for data transfers using bar codes. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data transfer with a plurality of bar codes, the method implemented with bar code presentation device and a bar code reader, the method comprising:
   presenting, on a display screen of the bar code presentation device to a bar code reader, a plurality of bar codes making up the data transfer, each presentation of each bar code separated by a predetermined period of time;
   displaying, with each bar code at predetermined location on the display screen, a unique sequence identification for each bar code and the total number of bar codes making up the data transfer;
   reading, by the bar code reader, a plurality of bar codes;
   reading, for each bar code read by the bar code reader, the unique sequence identification of the bar code and the total number of bar codes making up the data transfer;
   determining, after attempting to read all of the plurality of bar codes, by the bar code reader in dependence upon the number of bar codes read and the total number of bar codes making up the data transfer whether all of the bar codes making up the data transfer have been read;
   identifying, after attempting to read all of the plurality of bar codes, by the bar code reader if all of the bar codes making up the data transfer have not been read, an identified sequence number of a bar code not read;
   reading, by the bar code reader from the bar code presentation device, the bar code having the identified sequence number; and
   providing to a user a predetermined positive notification if all of the bar codes making up the data transfer have been read.

2. The method of claim 1 further comprising providing to the user a predetermined negative notification if all of the bar codes making up the data transfer have not been read.

3. The method of claim 2 wherein the positive notification and the negative notification comprises predetermined audio indications.

4. The method of claim 2 wherein the positive notification and the negative notification comprises predetermined visual indications.

5. The method of claim 1 wherein the unique sequence identification comprises a unique dot pattern.

6. The method of claim 1 wherein the unique sequence identification comprises alphanumeric characters.

7. The method of claim 1 wherein the unique sequence identification comprises a bar code.

8. An apparatus for data transfer with a plurality of bar codes, the apparatus including an imaging device and a computer memory operatively coupled to a computer processor, the computer memory having disposed within it computer program instructions for:
   reading, from a bar code presentation device, a plurality of bar codes;
   reading, for each bar code read, a unique sequence identification of the bar code and the total number of bar codes making up a data transfer;
   determining, after attempting to read all of the plurality of bar codes, in dependence upon the number of bar codes read and the total number of bar codes making up the data transfer whether all of the bar codes making up the data transfer have been read;
   identifying, after attempting to read all of the plurality of bar codes, by the bar code reader if all of the bar codes making up the data transfer have not been read, an identified sequence number of a bar code not read;
   reading, by the bar code reader from the bar code presentation device, the bar code having the identified sequence number; and
   providing to a user a predetermined positive notification if all of the bar codes making up the data transfer have been read.

9. The apparatus of claim 8 wherein the computer memory has disposed within it computer program instructions for providing to the user a predetermined negative notification if all of the bar codes making up the data transfer have not been read.

10. A system of data transfer with a plurality of bar codes, the system implemented with bar code presentation device and a bar code reader, the system comprising:
computer program instructions for presenting, on a display screen of the bar code presentation device to a bar code reader, a plurality of bar codes making up the data transfer, each presentation of each bar code separated by a predetermined period of time;
computer program instructions for displaying, with each bar code at predetermined location on the display screen, a unique sequence identification for each bar code and the total number of bar codes making up the data transfer;
computer program instructions for reading, by the bar code reader, a plurality of bar codes;
computer program instructions for reading, for each bar code read by the bar code reader, the unique sequence identification of the bar code and the total number of bar codes making up the data transfer;
computer program instructions for determining, after attempting to read all of the plurality of bar codes, by the bar code reader in dependence upon the number of bar codes read and the total number of bar codes making up the data transfer whether all of the bar codes making up the data transfer have been read;
computer program instructions for identifying, after attempting to read all of the plurality of bar codes, by the bar code reader if all of the bar codes making up the data transfer have not been read, an identified sequence number of a bar code not read;
computer program instructions for reading, by the bar code reader from the bar code presentation device, the bar code having the identified sequence number; and
computer program instructions for providing to a user a predetermined positive notification if all of the bar codes making up the data transfer have been read; or
computer program instructions for providing to the user a predetermined negative notification if all of the bar codes making up the data transfer have not been read.

11. A computer program product for data transfer with a plurality of bar codes, the computer program product disposed in a computer readable recording medium, the computer program product comprising computer program instructions for:
reading a plurality of bar codes;
reading, for each bar code read, a unique sequence identification of the bar code and the total number of bar codes making up the data transfer;
determining, after attempting to read all of the plurality of bar codes, in dependence upon the number of bar codes read and the total number of bar codes making up the data transfer whether all of the bar codes making up the data transfer have been read;
identifying, after attempting to read all of the plurality of bar codes, by the bar code reader if all of the bar codes making up the data transfer have not been read, an identified sequence number of a bar code not read;
reading, by the bar code reader from the bar code presentation device, the bar code having the identified sequence number; and
providing to a user a predetermined positive notification if all of the bar codes making up the data transfer have been read.

12. The computer program product of claim 11 further comprising computer program instructions for providing to the user a predetermined negative notification if all of the bar codes making up the data transfer have not been read.

* * * * *